(12) United States Patent
Siemers (10) Patent No.: US 6,210,457 B1
(45) Date of Patent: *Apr. 3, 2001

(54) TRANSPARENT LID FOR AUXILIARY DUST REMOVAL RECEPTACLE

(75) Inventor: Matthew Bruce Siemers, Ottawa (CA)

(73) Assignee: Lee Valley Tools Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,139

(22) Filed: Jun. 7, 1999

Related U.S. Application Data (63) Continuation-in-part of application No. 09/057,284, filed on Apr. 8, 1998, now Pat. No. 6,027,541.

(51) Int. Cl.⁷ .................................................. B01D 45/16
(52) U.S. Cl. .............................. 55/429; 55/435; 55/449; 55/459.2; 96/416
(58) Field of Search .......................... 55/428, 429, 435, 55/439, 447–450, 454, 459.1, 459.2, 460, 467, 471, 472; 96/415, 416

(56) References Cited

U.S. PATENT DOCUMENTS

| | | | |
|---|---|---|---|
| 1,064,412 | * 6/1913 | White ............................... | 96/416 X |
| 1,143,833 | * 6/1915 | Keller .............................. | 96/416 X |
| 1,145,047 | * 7/1915 | Wiedemann et al. ................. | 96/416 |
| 1,868,519 | * 7/1932 | Breuer .............................. | 96/416 X |
| 2,384,699 | 9/1945 | Russell et al. . | |
| 2,534,702 | 12/1950 | Driessen ............................ | 55/460 |
| 2,536,219 | * 1/1951 | Queen ............................... | 96/416 |
| 2,905,266 | 9/1959 | Poch . | |
| 2,962,118 | * 11/1960 | Lee et al. .......................... | 55/471 X |
| 3,233,882 | 2/1966 | Calaceto ........................... | 261/118 |
| 3,308,609 | 3/1967 | McCulloch et al. ................. | 55/449 X |
| 3,370,408 | 2/1968 | Lehrer et al. ...................... | 55/449 X |
| 3,490,208 | 1/1970 | Meyer et al. ...................... | 55/429 X |
| 3,568,413 | * 3/1971 | Jerabek ............................. | 55/467 X |
| 3,591,945 | * 7/1971 | Eisel ................................. | 96/416 |
| 3,740,933 | 6/1973 | Hollowell .......................... | 55/435 X |
| 3,771,295 | 11/1973 | Wheeler, Jr. ...................... | 55/449 X |
| 3,775,951 | * 12/1973 | Eicholz et al. .................... | 55/467 X |
| 3,803,810 | * 4/1974 | Rosenberg ........................ | 96/416 X |
| 3,816,982 | 6/1974 | Regnault ........................... | 55/449 X |
| 3,921,250 | * 11/1975 | Jerabek ............................. | 55/467 X |
| 3,955,950 | 5/1976 | Miller, Jr. ......................... | 55/459.1 |
| 3,963,891 | * 6/1976 | de Magondeaux ................ | 96/416 X |
| 4,019,883 | 4/1977 | Klomp .............................. | 55/460 X |
| 4,105,420 | * 8/1978 | Moore ............................... | 96/416 |
| 4,222,753 | * 9/1980 | Mills ................................. | 96/415 |

(List continued on next page.)

OTHER PUBLICATIONS

P. 57, 1987 issue of *Wood Magazine*.

Article, publisher unknown, entitled *How can I convert my Dust Collection System to a "Two Stage System?"* and bearing the date stamp of Michael C. Payden—Feb. 23, 1994.

Pp. 98–119, Chapter 6, of book entitiled *Woodshop Dust Control* by Sandor Nagyszanlaczy, published 1996.

Page printed from *Wood Magazine's* website (http://www.woodmagazine.com/ideashop3/cyclone.html) entitled *Idea Shop 3*, admitted to have been available prior to Apr. 7, 1998.

*Primary Examiner*—Robert H. Spitzer
(74) *Attorney, Agent, or Firm*—Kristin L. Johnson, Esq.; John S. Pratt, Esq.; Kilpatrick Stockton (57) ABSTRACT

A transparent molded plastic lid for use on an auxiliary trash collection container used with a shop vacuum cleaner or dust collector system that permits inspection of the container contents without removal of the lid.

17 Claims, 5 Drawing Sheets

U.S. PATENT DOCUMENTS

| | | | |
|---|---|---|---|
| 4,311,492 | * 1/1982 | Eltvedt | 96/416 |
| 4,341,540 | * 7/1982 | Howerin | 96/416 X |
| 4,476,608 | 10/1984 | Rasmussen | 55/429.2 X |
| 4,531,258 | 7/1985 | Spellman | 55/429 X |
| 4,662,909 | 5/1987 | Dürr | 55/459.2 X |
| 5,047,089 | 9/1991 | Grant | 134/21 |
| 5,236,479 | 8/1993 | Billingsley | 55/459.2 X |
| 5,269,637 | 12/1993 | Gomes, Jr. | 406/173 |
| 5,525,396 | 6/1996 | Rudolph et al. | 428/131 |
| 6,027,541 | * 2/2000 | Siemers | 55/429 |

* cited by examiner

TRANSPARENT LID FOR AUXILIARY DUST REMOVAL RECEPTACLE

CROSS REFERENCE TO RELATED APPLICATION

This is a continuation-in-part of U.S. patent application Ser. No. 09/057,284 filed Apr. 8, 1998, now U.S. Pat. No. 6,027,541, which is incorporated herein by reference.

BACKGROUND OF THE INVENTION

1. Field of the Invention

This invention relates to dust removal systems, shop vacuum cleaners, dust separation devices and auxiliary containers to receive sawdust, planer shavings and other particles and materials collected by dust removal systems and shop vacuum cleaners.

2. The Prior Art

Shop vacuum cleaners and a substantial variety of sizes and configurations of dust removal systems are widely used in home workshops, cabinet shops and commercial woodworking facilities for the collection and removal of sawdust, planer chips, sanding dust, and other dust and particulate matter produced during operation of such facilities. Typical shop vacuum cleaners draw air and waste through a flexible hose into a bucket-like waste collection chamber. There the air is drawn through a filter, typically a pleated filter of nonwoven fibrous material, which catches most of the waste material, allowing relatively clean air to be discharged. Dust collectors typically utilize a squirrel cage fan that draws air and debris through the fan and into a sleeve-like structure oriented vertically so that a cloth waste collection bag can hang below the structure and air can exit through a cloth bag attached to, and which inflated during use above, the sleeve. The capacity of each of these devices is limited to the capacity of the rigid bucket-like container in the case of the shop vacuum and the lower waste receiving bag or bags in the case of the dust collector.

Efforts have been undertaken to increase the quantity of sawdust and other waste that can be collected using such devices (without emptying the waste reservoirs) by drawing the air and collected debris first through or adjacent to an auxiliary waste collection receptacle into which some of the waste falls, thereby increasing the overall capacity of the system by the volume of the auxiliary receptacle.

One widely available device to accomplish this is a replacement lid intended to be positioned on top of a trash container or other receptacle having an open top and is described in U.S. Pat. No. 5,525,396. This lid has entrance and exit holes for tubing and a baffle between the entrance and exit so that some of the dust and other debris entrained in an air stream passing through the device falls down into the trash container or other receptacle on which the device rests. Because this replacement lid is opaque and it must be used on a rigid container (rather than, for instance, with a cloth bag), the lid must be removed to determine whether the container on which it is used is full.

SUMMARY OF THE INVENTION

This invention is a transparent lid for use with a trash can or drum as an intermediate collection receptacle with a shop vacuum cleaner or dust collection system. Among other configurations, the lid may be molded of plastic for use on a twenty inch diameter trash can or twenty four inch diameter steel drum or other similar container, together with a shop vacuum cleaner or a dust collection system. Air and entrained particles such as saw dust are drawn into an inlet in the lid, and air is drawn from an outlet in the lid to the conventional shop vacuum cleaner or dust collection system. The inlet is positioned near the rim of the lid and generally tangent to the rim. The outlet is positioned in the center of the lid. The position of the inlet directs incoming air and entrained particles into the container near its inside wall and at a angle approximately 25° below the vertical plane within which the lid generally sits. Outgoing air is drawn from the center of the lid at a steeper angle of about 45°. The resulting airflow induces a vigorous cyclone-like air movement or a vortex in the trash container, which generally prevents entrained dust and particles from joining the outgoing airflow. Instead, incoming air travels in a downward spiral in which centrifugal force prevents particles from immediately following the outward flow of air. Like the eye of a hurricane, air pressure in the central region below the lid is lower than the pressure within the moving air at the periphery of the lid and near the trash container wall. As a result of these air movements, dust and other incoming particles tend to drop out of the air stream and remain in the trash container, more effectively separating dust and particles than a conventional baffle-type lid.

The cyclone-like air movement established within a container on which the lid of the present invention rests is less turbulent then airflow utilizing a baffle-type lid. This makes the dust removal or vacuum system within which the present invention is used more efficient in that there is greater airflow with a given exertion of energy than with an otherwise comparable system using a baffle-type lid. The inlets and outlets of the lid of the present invention can be bored to receive the ends of a conventional flexible dust collector hose, such as a four inch diameter hose. Alternatively, the inlets and outlets can be bored to receive conventional 2.3 inch diameter shop vacuum hoses and fittings or other desired sizes.

The lid of the present invention has a stepped rim so that it can be used on a conventional trash can having a nominal diameter of twenty inches or on a fifty gallon drum that is typically twenty-four inches in diameter. The stepped structure ensures a tight fit with the lid properly centered on either size container. The greater air pressure on the outside of the lid during use with a shop vacuum cleaner or dust removal system presses down on the lid, effectively sealing it against the trash container on which it is mounted.

If the inlet hose attached to the lid of the present invention is blocked or otherwise closed, the resulting reduction in pressure inside the trash receptacle can cause the generally domed lid of the present invention to be forced into the trash container in an "inverted" position like an umbrella that is turned inside out by a strong wind. The lid can easily be popped back the other way, however. The risk of such inversion can also be avoided by providing a small hole in the lid, such as a 0.75 inch diameter hole.

Lid transparency makes it easy to determine at a glance how full the container has become by looking through the lid without the need to lift or remove the lid. As an alternative to fabricating the entire lid of transparent material, a transparent window or porthole can be formed in the lid by molding a portion of the lid of transparent plastic material or by removing a portion of a non-transparent lid and replacing it with a transparent "window" material such as clear plastic or glass.

Such a transparent lid or a lid with a transparent porthole can be manufactured in other shapes including, for instance, the lid depicted in U.S. Pat. No. 5,525,396.

A plastic garbage bag can be used as a removable trash container bag in which collected dust can be discarded. In order to prevent such a plastic bag from being drawn toward the lid outlet, the bag can be placed in the trash container and then generally held in place with a sheet of resilient plastic material that is bent into a tube-like form, placed inside the bag, and then permitted to expand or unroll to hold the bag against the trash container wall.

It is an object of the this invention to provide a lid for separating dust into a container intermediate a dust source and a vacuum cleaner or dust collector which lid permits the contents of the intermediate container to be inspected without removing the lid.

It is also an object of the present invention to provide for cyclonic dust separation in a trash container.

It is a further object of the present invention to provide for accommodation of two or more sizes of dust collector hose or vacuum hoses or fittings in an auxiliary container lid.

It is a further object of the present invention to provide a cyclonic action dust separation lid that seats on at least two diameters of conventional containers.

It is another object of the present invention to provide, in a cyclonic dust separation lid, inlet and outlet orientation and positioning that allows for use of the lid and associated trash container in an "in line" hose configuration so that inlet and outlet hoses generally travel in the same horizontal line.

It is another object of the present invention to provide a trash container lid usable with a wet/dry vacuum cleaner for separation of water from a stream of air.

It is further object of the present invention to provide for pressure equalization in a cyclonic-type dust separation lid so that lid will not be unduly distorted if the vacuum inlet hose is closed or blocked.

It is further object of the present invention to provide for use of a disposable trash bag in a dust container used with a cyclonic-type dust separation lid.

Finally, it is an object of the present invention to provide an economical way of providing an auxiliary dust collecting container for use with a conventional dust collection system and shop-type vacuum cleaner.

These and other objects of the present invention will become apparent in the following detailed description of the invention, the accompanying drawings and the attached claims.

DETAILED DESCRIPTION OF THE DRAWINGS

Figure 1:
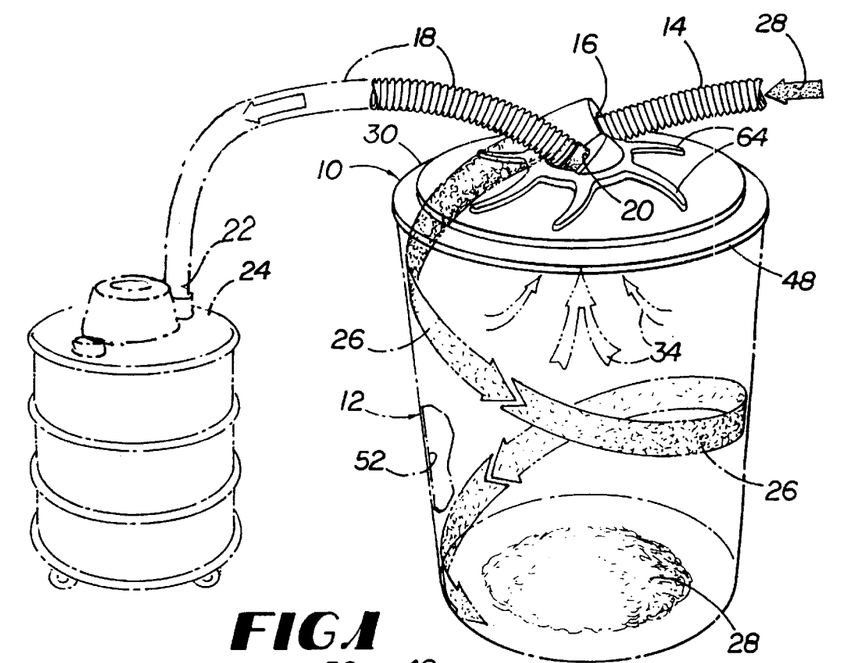
FIG. 1 is a perspective view of the cyclonic-type dust separation lid of the present invention shown in use with a shop vacuum cleaner and on top of a generally cylindrical trash container.

FIG. 1 shows the auxiliary trash container lid 10 of the present invention positioned on top of a trash container 12 with an inlet hose 14 connected to an inlet 16 in lid 10. An outlet hose 18 connects to a centrally located outlet 20 in lid 10. The remote end 22 of outlet hose 18 is connected to a conventional shop vacuum cleaner 24. The vacuum hoses 14 and 18 illustrated in FIG. 1 could alternatively be larger diameter dust collector hoses with a dust collector substituted for the shop vacuum 24.

As it is suggested by the arrows 26 in FIG. 1, air and entrained dust particles drawn into inlet hose 14 pass through inlet 16 in lid 10 near its periphery 30 (see FIG. 2) at an angle relative to the plane of the top edge or lip 32 of trash container 12 (see FIG. 3) so that dust flows as indicated by arrows 26 in a downward spiral within the generally cylindrical interior of container 12. Dust 28 and other matter entrained in the airflow 26 generally drops out of the airflow onto the bottom of container 12. Air containing relatively little entrained matter flows up the central region of container 12 as indicated by arrows 34, and out the centrally located outlet 20 of lid 10 through hose 18 to shop vacuum cleaner 24. The air is filtered, typically with a pleated filter, and ultimately is discharged by the shop vacuum cleaner 24.

As will be appreciated by reference to the figures, each of the inlet 16 and outlet 20 are provided by a hood and scoop arrangement connected by a circular plate. A hood-like structure 36 in the shape of a semi-cylindrical surface rises out of the generally dome-like top 38 of lid 10. A circular plate 40 lies against the projecting hood 36 and terminates the bottom of a scoop 42 that is also in the shape of a semi-cylindrical surface projecting below the doom-like top 38 of lid 10.

Figures 3, 4:
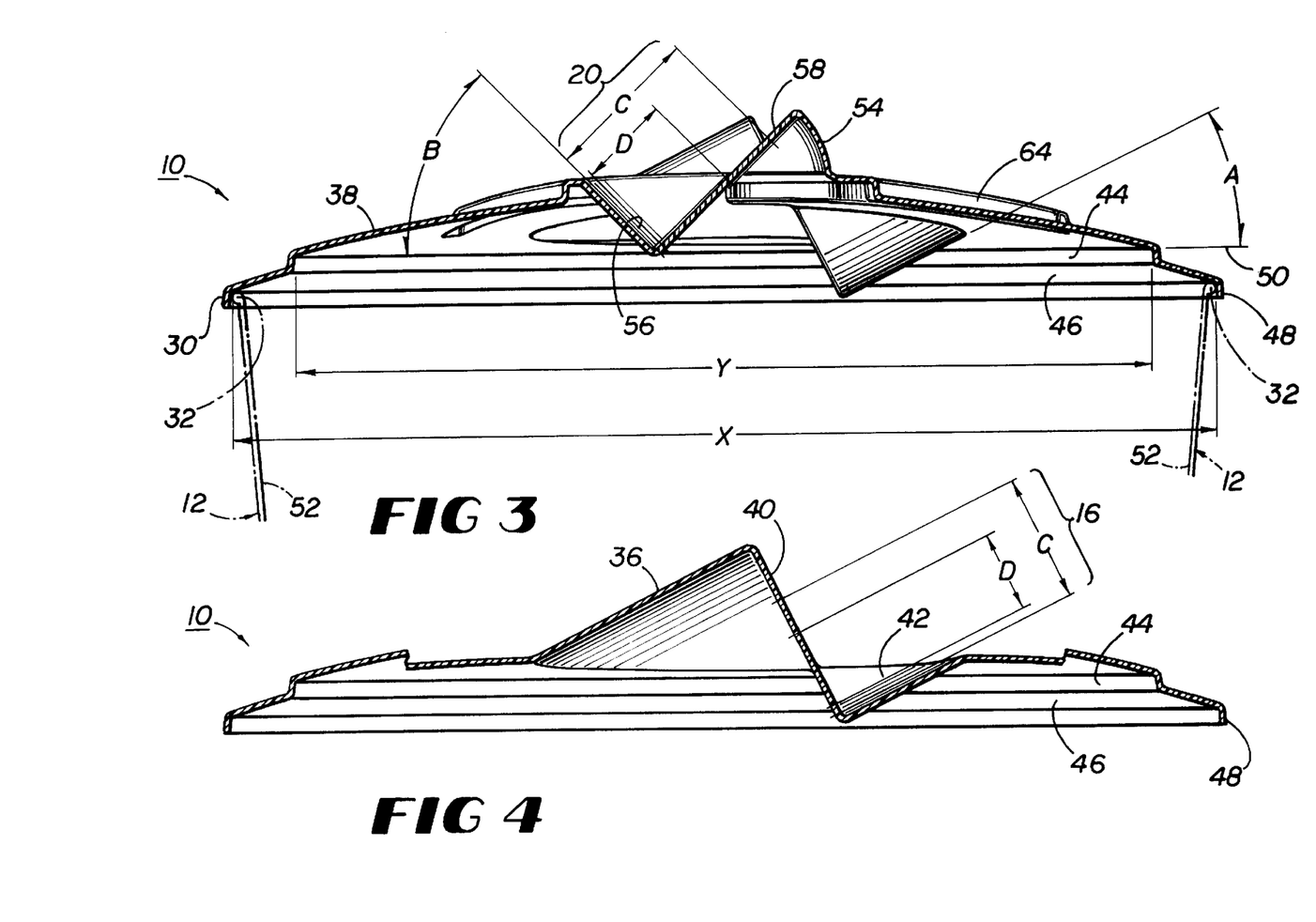
FIG. 3 is a sectional view taken along line 3—3 in FIG. 2.
FIG. 4 is a sectional view taken along line 4—4 in FIG. 2.

The dome-like top 38 of lid 10 is circumscribed by a generally vertical band 44 that steps the dome 38 down to a depressed generally horizontal area 46 that connects step down 44 to a second step down or depending skirt 48 that forms the largest diameter peripheral edge of lid 10. This step down structure allows lid 10 to be used alternatively on a larger diameter trash container 12, in which case lip 48 assists in positioning the lid on the container, or on a smaller diameter container (smaller than diameter y in FIG. 3) in which case step down 44 assists in positioning the lid on the container 12. For instance, if diameter x shown in FIG. 3 is a little larger than 24 inches, lid 10 can be used on a typical 50 gallon drum. Likewise, if diameter y shown in FIG. 3 is a little larger than 20 inches, lid 10 can be used on a conventional trash container 12 that is nominally 20 inches in diameter.

As will be appreciated by reference to FIG. 3, if scoop 42 and hood 36 are positioned at a relatively small angle A above the horizontal plane 50 of the lid 10 (with plate 40 positioned normal to that angle), inlet hose 14 will thereby be located with its longitudinal axis (in the vicinity of lid 10) at approximately same relatively low angle A. This angle should be on the order, for instance, of approximately 20–30°, optimally about 25°. This will cause air in the stream 28 to enter container 12 at this angle and travel along the inside 52 of container 12 in a downward spiral as indicated in arrows 26. By contrast, outlet 20 is formed by a hood 54, a scoop 56 and an outlet plate 58 at a larger angle B so that the longitudinal axis of outlet hose 18 where it connects to outlet 20 of lid 10 will be closer to vertical, thereby drawing air as indicated by arrows 34 in FIG. 1 from the central region of trash container 12. Angle B should be between approximately 35–55°, preferably between approximately 40–50°, and most preferably at approximately 45°. Plates 40 and 58 may be bored with holes of any convenient diameter to accommodate conventional dust collector system hoses or shop vacuum cleaner hoses. For instance, diameter C shown in FIGS. 3 and 4 may be four inches for four inch dust collector hoses. Similarly, diameter D on FIGS. 3 and 4 maybe 2.3 inches or any other diameter needed to accommodate shop vacuum cleaner hose fittings.

Figures 5, 6:
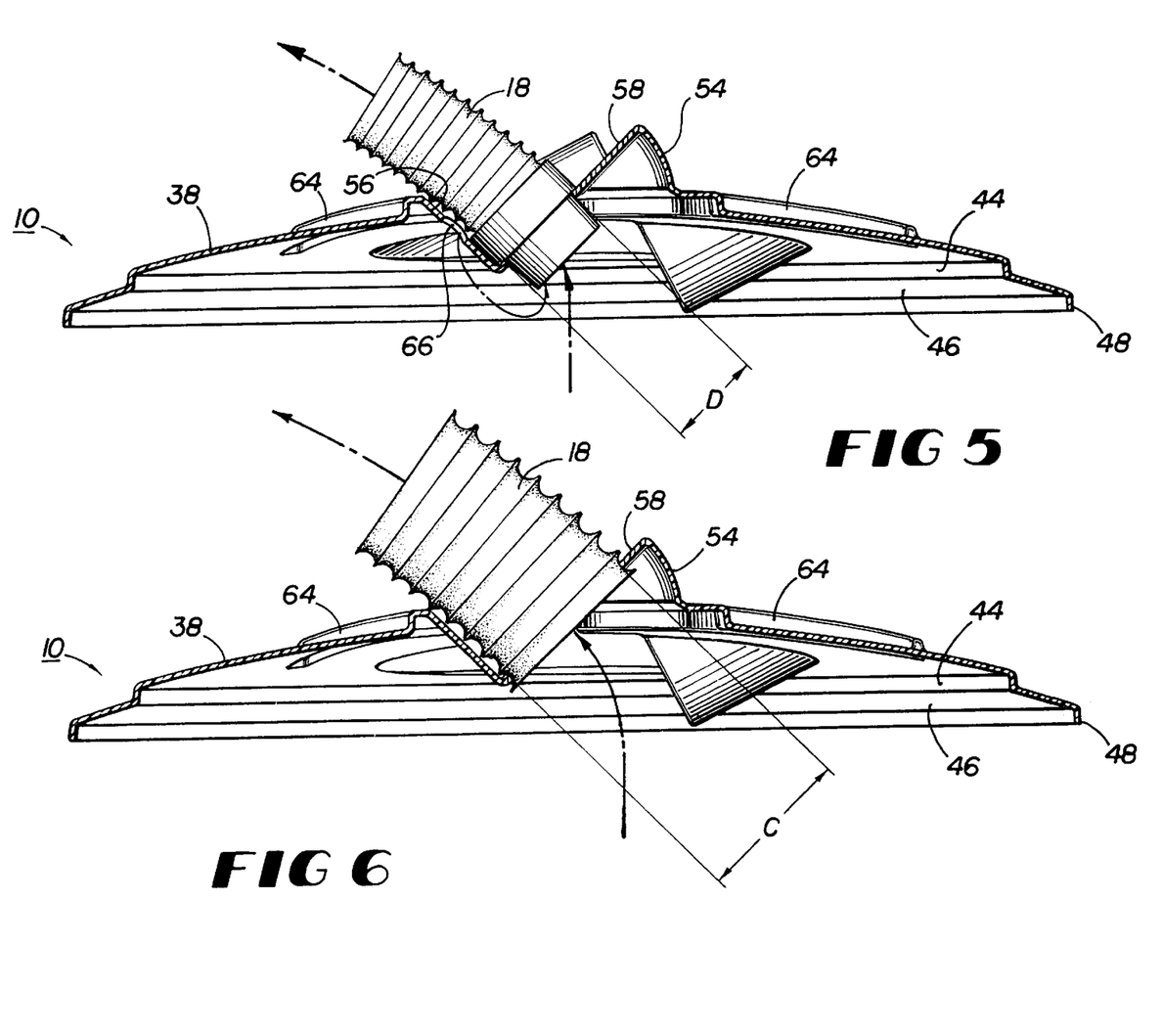
FIG. 5 is a sectional view similar to FIG. 3 showing a shop vacuum cleaner hose positioned in the outlet of the lid of the present invention.
FIG. 6 is a sectional view similar to FIG. 5 showing a larger diameter dust collection hose.

As will be apparent from the figures, particularly including FIGS. 3, 4, 5 and 6, the inlet hole 60 and outlet hole 62 (see FIG. 2) should be positioned with their lowest points near scoops 42 and 56. As FIGS. 5 and 6 show, this permits scoops 42 and 56 to support a portion of the hoses 14 and 18 where they attach to lid 10, both ensuring proper orientation of the hoses and facilitating their continued connection to lid 10 during use.

Figure 2:
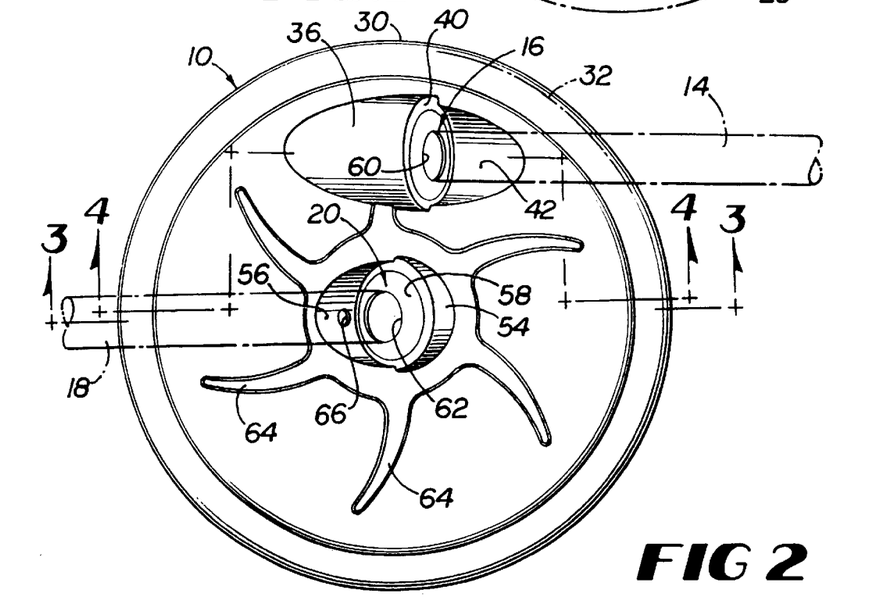
FIG. 2 is a plan view of the lid shown in FIG. 1.
Figure 7:
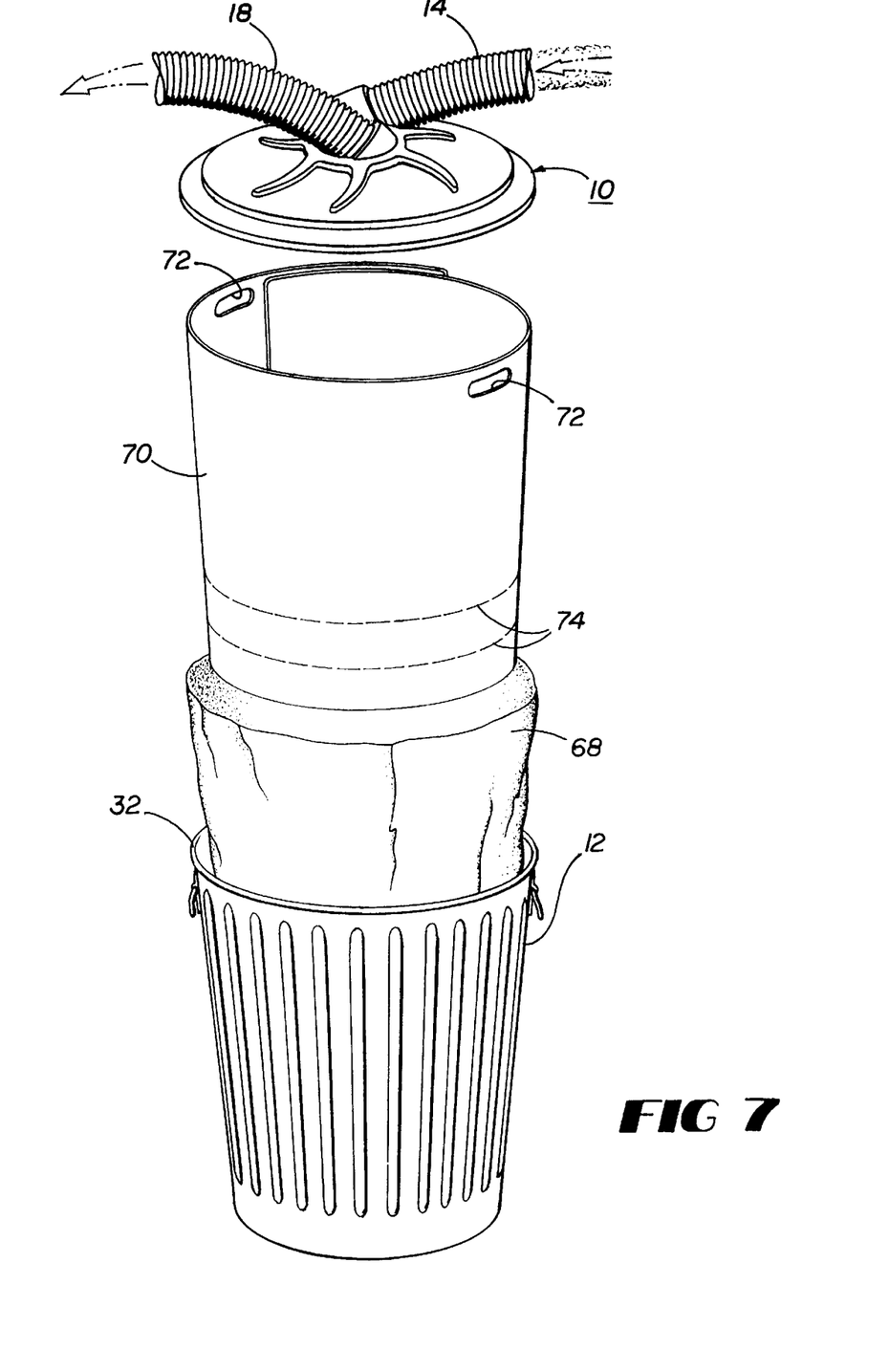
FIG. 7 is an exploded perspective view of the lid of the present invention shown together with a metal trash container, a plastic film trash bag, and a bag liner to prevent the bag from collapsing during use.

As is particularly well illustrated in FIGS. 1, 2 and 7, the generally dome-like shape of lid 10 is reinforced with ribs 64. Ribs 64 may be raised portions of the material from which lid 10 is made that generally radiate outward from the center of lid 10. These ribs maybe formed in the spider-like configuration of gently curved rib 64 illustrated in the figures, but may also be formed in a wide variety of other configurations, or may be made of rods or other materials bonded to lid 10. Ribs 64 rigidify lid 10 to facilitate its ability to retain its dome-like shape under the weight of hoses 14 and 18 and the force of air pressure on the top of lid 10 when the dust collector or shop vacuum 24 is on, thereby reducing the air pressure on the underside of lid 10.

As is explained above, when lid 10 is used with a powerful shop vacuum or dust collection system and inlet hose 14 is blocked or closed, external air pressure on the top of lid 10 can press it down into a trash container 12, thereby inverting its dome-like shape, notwithstanding the strength contributed by ribs 64. This can be prevented, however, by forming a relatively small diameter hole somewhere in the lid, which causes internal and external pressure on the lid to be more nearly equal without significantly reducing the capacity of the vacuum or dust collection system to collect debris. Such a hole can be, for instance, a ¾ inch diameter hole 66 in scoop 56, as illustrated in FIG. 2, an alternative that is practical when a relatively small diameter inlet hose 14 is in use. Alternatively, the hole 66 can be located in any other convenient location in lid 10.

Hole 66 can even be maintained closed during normal use of lid 10 without blockage of inlet hose 14 by closing it with structure or material that will open or fail only if the greater pressure differential is experienced inside and outside of lid 10 when inlet 14 is blocked. For instance, hole 66 could be covered with a weak plastic film that would fail in the presence of such a substantial pressure differential. It could also be fitted with a spring loaded, even adjustable, valve that would remain closed until there is such pressure differential.

As will be appreciated by those familiar with systems utilizing pressure differentials, as do vacuum and dust collector systems, trash container 12 needs to be fairly rigid to avoid collapse during use when the cumulative pressure differential between the inside and outside of container 12 is substantial. Accordingly, auxiliary trash containers 12 are typically metal. However, sufficiently rigid plastic containers are also certainly usable. For similar reasons, a plastic film trash bag or other liner cannot be used inside container 12 unless steps are taken to avoid its collapse during use.

An apparatus permitting the use of a plastic film bag 68 inside of trash container 12 is illustrated in FIG. 7 as resilient plastic sheet 70. Sheet 70 is a generally rectangular sheet of plastic or other material having sufficient rigidity to resist collapse of bag 68 but sufficient bendability to be rolled into a cylindrical shape that fits inside bag 68 and presses it against the inside of trash container 12. Sheet 70 may have generally oblong cut outs 72 to serve as hand holds to facilitate manipulation of sheet 70. Dotted lines 74 in FIG. 7 indicate break lines or cutting lines that can be used to shorten sheet 70. Sheet 70 may be made of a variety of materials including, for instance, polypropylene, polyethylene, high impact polystyrene, acrylonitrile-butadine-styrene, polyvinylchloride, acrylic or other plastic resin systems.

Figure 8:
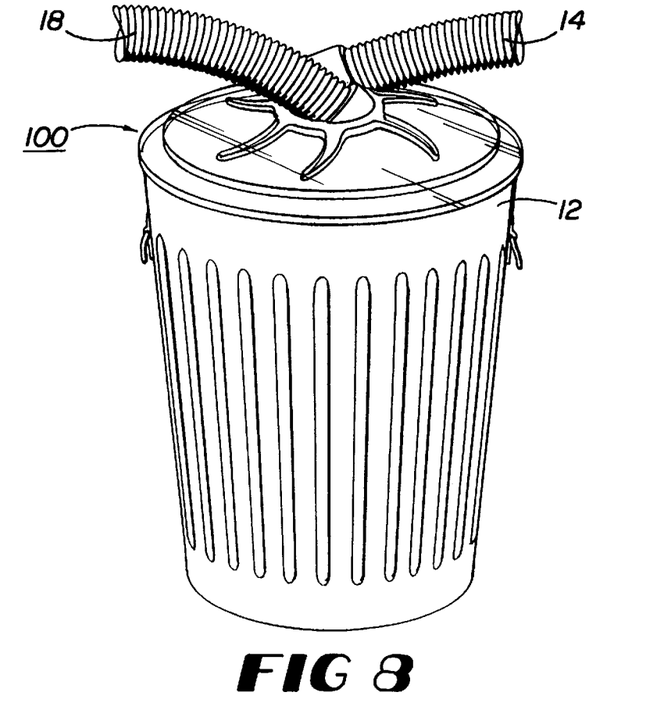
FIG. 8 is a perspective view of the transparent dust separation lid of this invention shown in use on top of a conventional metal trash container.
Figure 9:
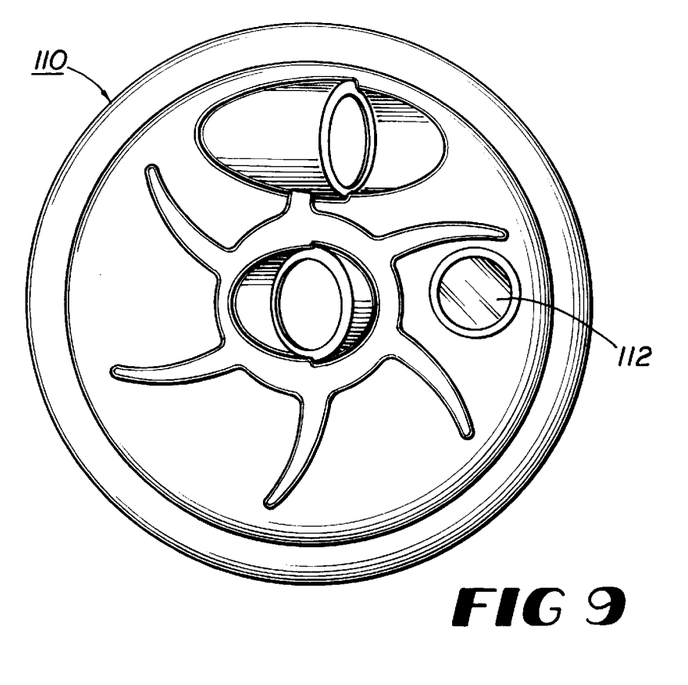
FIG. 9 is a plan view of an alternative embodiment of the lid of this invention with a transparent porthole.

FIGS. 8 and 9, respectively, show a completely transparent lid 100 and a lid 110 with a transparent porthole 112 as alternative embodiments of the present invention.

The lid 10 of the present invention may be formed of a variety of materials including, for instance, formed sheet metal and cast metal. A more cost effective method of forming lid 10, however, is to mold it of plastic utilizing, for instance, vacuum forming, thermoforming, high or low pressure injection molding, compression molding, reaction injection molding or other suitable processes, as will be apparent to those skilled in the art of plastics manufacturing. Suitable plastic materials usable to manufacture lids 10, 100 and 110 include polypropylene, polyethylene, polyethylene terephthalate, high impact polystyrene, acrylonitrile-butadine-styrene, polyvinylchloride, acrylic, polycarbonate and other polymer resins and resin systems with or without reinforcing materials such as glass or aramid fibers. Suitable materials for transparent lid 100 include polyethylene terephthalate and polycarbonate, although polycarbonate can be less easily machined. Both of these materials and glass are suitable for the transparent porthole member 112.

As will be appreciated by those skilled in the art, the foregoing invention can be practiced with a substantial number of variations and modifications without departing from the scope and spirit of the invention as described above, in the accompanying drawings and the following claims.

What is claimed is:

1. A lid for use:
    (a) on a container having a side attached to or forming a rim that generally lies in a plane and against which the lid may rest; and
    (b) with a system for drawing air and entrained material through a hose, the lid comprising a round, generally dome-shaped transparent plate having a center, which plate is penetrated by:
        (i) an inlet for directing incoming air and entrained material downward and alongside the container side, the inlet comprising an inlet hood projecting out of the plate, a scoop recessed below the plate and an inlet panel connecting the hood to the scoop and penetrated by an inlet hole to receive an inlet hose positioned at an inlet angle relative to the plane; and
        (ii) an outlet for exhausting air from approximately the center of the lid.

2. The lid of claim 1, wherein the inlet angle is approximately 20 to 30 degrees.

3. The lid of claim 1, wherein the outlet is positioned to exhaust air at an angle of approximately 35 to 55 degrees relative to the plane.

4. The lid of claim 1, wherein the outlet is positioned to exhaust air at an angle of approximately 40 to 50 degrees relative to the plane.

5. The lid of claim 1, wherein the outlet is positioned to exhaust air at an angle of approximately 45 degrees relative to the plane.

6. The lid of claim 1, wherein the material from which the lid is formed comprises polyethelyne terephthalate.

7. The lid of claim 1, further comprising a pressure relief opening positioned in the lid to permit airflow therethrough.

8. The lid of claim 1, wherein the peripheral edge of the lid is stepped to form an inner dependent lip having a first diameter and an outer dependent lip larger in diameter than the first lip and connected to the first lip by a generally horizontal web that lies against the rim of the container when the rim is smaller in diameter than the outer lip but larger in diameter than the inner lip.

9. The lid of claim 1, wherein the inlet angle is approximately 25 degrees.

10. The lid of claim 1, wherein the inlet hole is positioned in the inlet panel proximate the scoop so that the scoop can support a portion of the inlet hose.

11. The lid of claim 1, wherein the outlet is formed by a hood projecting out of the plate, a scoop recessed below the plate and an outlet panel connecting the hood to the scoop and penetrated by an outlet hole to receive an outlet hose positioned at an outlet angle relative to the plane.

12. The lid of claim 11, wherein the outlet angle is approximately 45 degrees.

13. The lid of claim 11, wherein the outlet hole is positioned in the outlet panel proximate the scoop so that the scoop can support a portion of the outlet hose.

14. A lid for use:
   (a) on a container having a side attached to or forming a rim that generally lies in a plane and against which the lid may rest; and
   (b) with a system for drawing air and entrained material through a hose, the lid comprising a round, generally dome-shaped transparent plate having a center and generally radial ribs reinforcing the lid, which plate is penetrated by:
      (i) an inlet for directing incoming air and entrained material downward at an inlet angle relative to the plane and alongside the container side; and
      (ii) an outlet for exhausting air from approximately the center of the lid.

15. A lid for use:
   (a) on a container having a side attached to or forming a rim that generally lies in a plane and against which the lid may rest and
   (b) with a system for drawing air and entrained material through a hose, the lid comprising a round, generally dome-shaped transparent molded plastic plate having a center, which plate is penetrated by:
      (i) an inlet for directing incoming air and entrained material downward and alongside the container side, the inlet formed by an inlet hood projecting out of the plate, an inlet scoop recessed below the plate and a generally flat, generally round inlet panel connecting the hood to the scoop and penetrated by an inlet hole to receive an inlet hose positioned at an inlet angle of approximately 25 degrees relative to the plane, and
      (ii) an outlet for exhausting air from approximately the center of the lid, the outlet formed by an outlet hood projecting out of the plate, an outlet scoop recessed below the plate and a generally flat, generally round outlet panel connecting the hood to the scoop and penetrated by an outlet hole to receive an outlet hose positioned at an outlet angle of approximately 45 degrees relative to the plane.

16. The lid of claim 15, wherein the inlet hole is positioned in the inlet panel proximate the inlet scoop and the outlet hole is positioned in the outlet panel proximate the outlet scoop so that the scoops can support portions of hoses connected to the lid.

17. The lid of claim 15, wherein the plastic comprises polyethylene terephthalate.

\* \* \* \* \*